United States Patent
Lee et al.

(10) Patent No.: US 8,739,039 B2
(45) Date of Patent: May 27, 2014

(54) TERMINAL AND CONTROLLING METHOD THEREOF

(75) Inventors: Sun Im Lee, Gyeonggi-do (KR); Jae Hun Ryu, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 1433 days.

(21) Appl. No.: 12/430,027

(22) Filed: Apr. 24, 2009

(65) Prior Publication Data

US 2010/0097310 A1 Apr. 22, 2010

(30) Foreign Application Priority Data

Oct. 16, 2008 (KR) ........................ 10-2008-0101545

(51) Int. Cl.
*G06F 3/00* (2006.01)
*G06F 3/048* (2013.01)

(52) U.S. Cl.
USPC ............ 715/719; 715/744; 715/745; 715/789

(58) Field of Classification Search
USPC .................................. 715/719, 789, 744, 745
See application file for complete search history.

(56) References Cited

U.S. PATENT DOCUMENTS

| | | | | |
|---|---|---|---|---|
| 5,375,068 A * | 12/1994 | Palmer et al. | ................ | 709/204 |
| 5,615,339 A * | 3/1997 | Ban | ................ | 709/227 |
| 5,894,320 A * | 4/1999 | Vancelette | ................ | 725/138 |
| 6,564,261 B1 * | 5/2003 | Gudjonsson et al. | ........ | 709/227 |
| 7,373,142 B2 * | 5/2008 | Scott | ................ | 455/418 |
| 7,523,398 B2 * | 4/2009 | Watanabe | ................ | 715/745 |
| 7,941,752 B2 * | 5/2011 | Ozugur et al. | ................ | 715/739 |
| 8,138,896 B2 * | 3/2012 | Fadell et al. | ................ | 340/407.2 |
| 8,260,854 B2 * | 9/2012 | Cockerton | ................ | 709/204 |
| 8,325,213 B2 * | 12/2012 | Lamb et al. | ................ | 348/14.01 |
| 2002/0093529 A1 * | 7/2002 | Daoud et al. | ................ | 345/745 |
| 2003/0167176 A1 * | 9/2003 | Knudson et al. | ................ | 705/1 |
| 2004/0073643 A1 * | 4/2004 | Hayes et al. | ................ | 709/223 |
| 2004/0228327 A1 * | 11/2004 | Punjabi et al. | ................ | 370/352 |
| 2007/0002946 A1 * | 1/2007 | Bouton et al. | ........... | 375/240.01 |
| 2007/0127451 A1 * | 6/2007 | Jung et al. | ................ | 370/356 |
| 2007/0140532 A1 * | 6/2007 | Goffin | ................ | 382/118 |
| 2007/0218924 A1 * | 9/2007 | Burman et al. | ................ | 455/466 |
| 2007/0274251 A1 * | 11/2007 | Hagihara | ................ | 370/328 |
| 2008/0318560 A1 * | 12/2008 | Reifman | ................ | 455/415 |
| 2009/0031253 A1 * | 1/2009 | Lee et al. | ................ | 715/835 |
| 2009/0165145 A1 * | 6/2009 | Haapsaari et al. | ................ | 726/28 |
| 2009/0197647 A1 * | 8/2009 | Shin | ................ | 455/566 |
| 2009/0296910 A1 * | 12/2009 | Bushnell et al. | ......... | 379/202.01 |
| 2009/0296913 A1 * | 12/2009 | Thomas et al. | ......... | 379/211.02 |
| 2009/0315973 A1 * | 12/2009 | Izotov et al. | ................ | 348/14.07 |
| 2010/0306762 A1 * | 12/2010 | Lindberg et al. | ................ | 717/176 |

OTHER PUBLICATIONS

Brad Miser My iPhone Oct. 16, 2007 2 pages.*

* cited by examiner

*Primary Examiner* — Andrea Long
(74) *Attorney, Agent, or Firm* — Lee, Hong, Degerman, Kang & Waimey

(57) ABSTRACT

A terminal having a video communication function includes camera configured to capture image data, a memory configured to stored the captured image data, a wireless communication unit configured to permit a video communication during which the image data is communicated to a correspondent terminal, a display configured to display a user interface during the video communication, and a controller configured to store in the memory, responsive to termination of the video communication with the correspondent terminal, any portions of configuration setting information for the user interface that has been modified during the video communication.

20 Claims, 13 Drawing Sheets

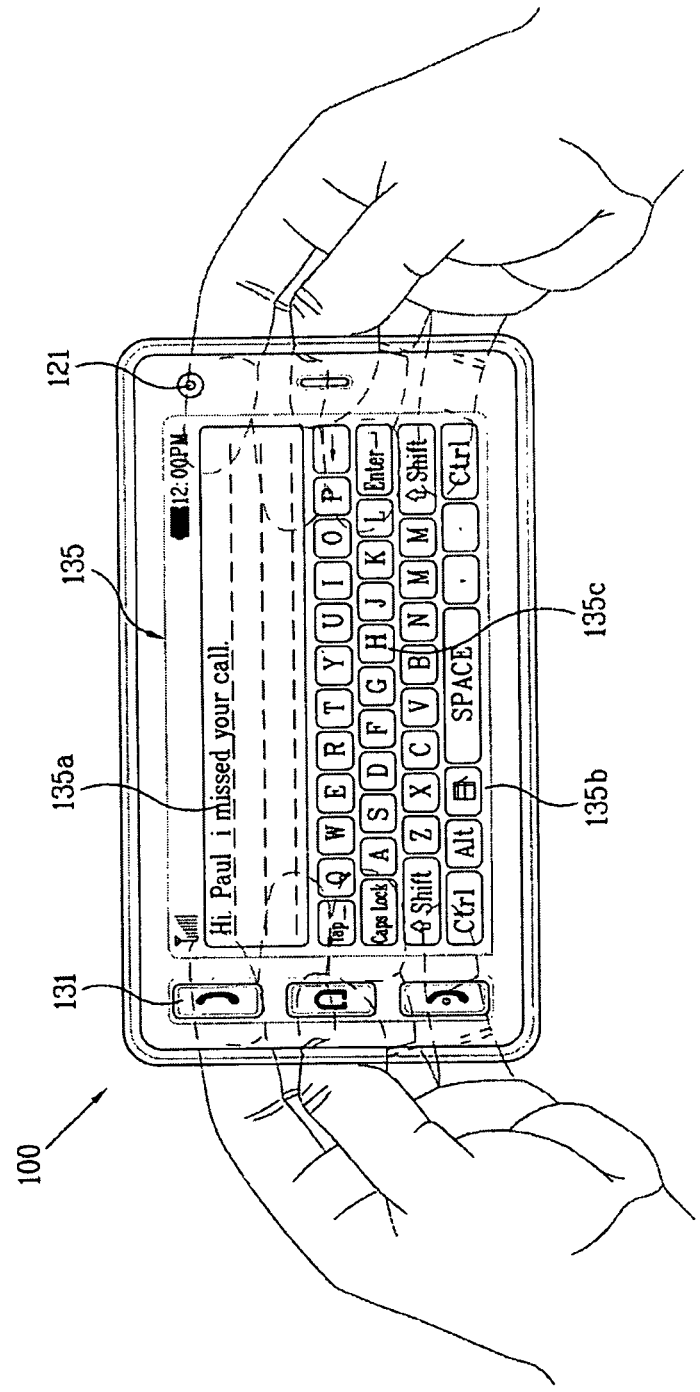

(a)  (b)

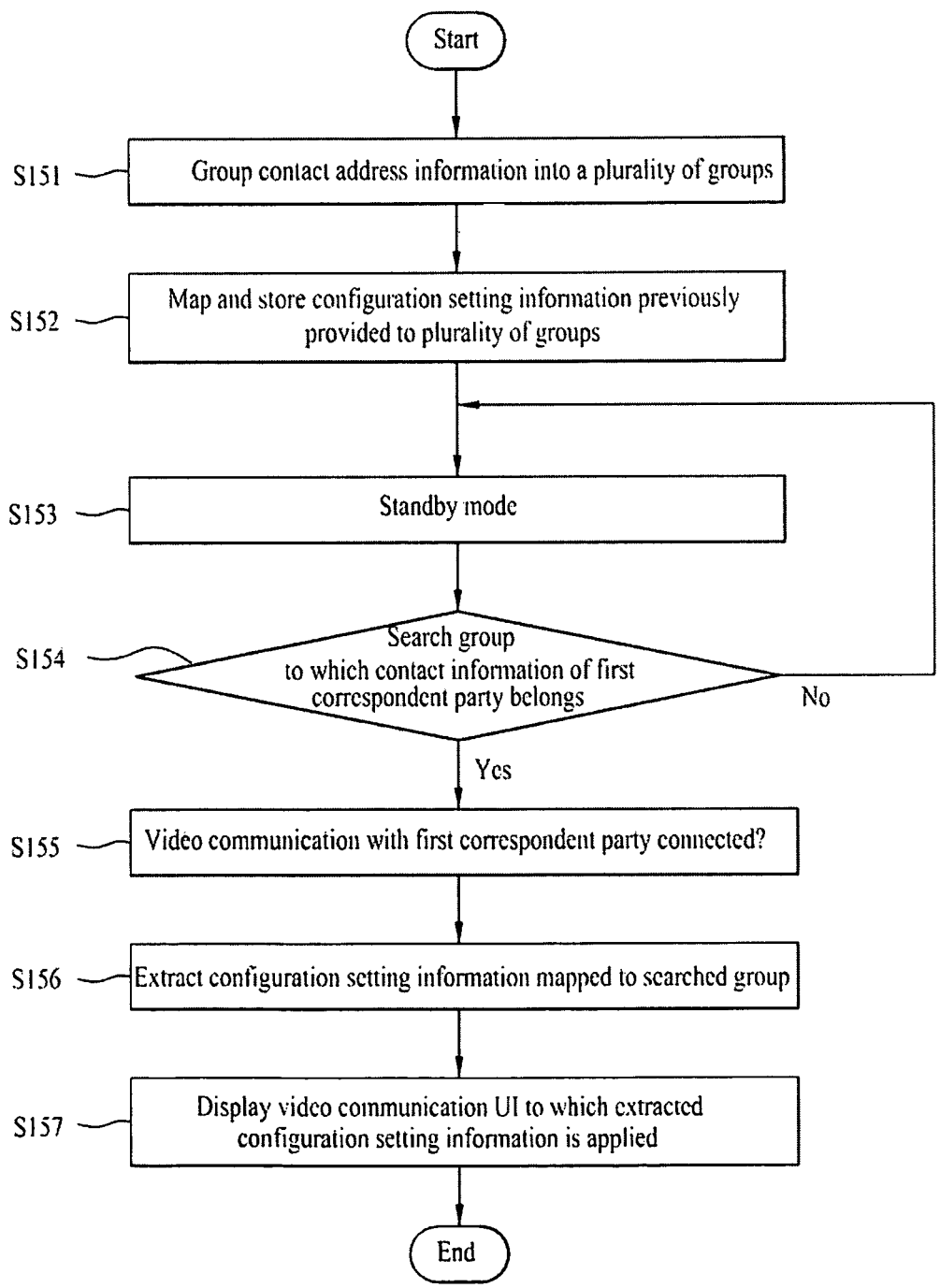

TERMINAL AND CONTROLLING METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2008-0101545, filed on Oct. 16, 2008, the contents of which are hereby incorporated by reference herein in their entirety.

FIELD OF THE INVENTION

The present invention relates to a terminal and a controlling method thereof. While the present invention is suitable for a wide scope of applications, it is particularly suitable for providing a video communication function.

DISCUSSION OF THE RELATED ART

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to the presence or absence of mobility. The mobile terminals can be further classified into handheld terminals and vehicle mounted terminals according to their mode of portability.

There are ongoing efforts to support and increase the functionality of mobile terminals. Such efforts include software and hardware improvements, as well as changes and improvements in the structural components which form the mobile terminal.

Currently, various kinds of terminals capable of video communication are manufactured. The video communication is provided to a terminal with a video call function and a video chatting function according to the video communication protocols such as H. 223, H. 245, H. 324M.

SUMMARY OF THE INVENTION

In accordance with an embodiment, a terminal having a video communication function includes a camera configured to capture image data, a memory configured to store the captured image data, a wireless communication unit configured to permit a video communication during which the image data is communicated to a correspondent terminal, a display configured to display a user interface during the video communication, and a controller configured to store in the memory, responsive to termination of the video communication with the correspondent terminal, any portions of configuration setting information for the user interface that has been modified during the video communication.

In accordance with an embodiment, a method of controlling a terminal having a video communication function includes performing a video communication with a correspondent terminal, displaying a user interface during the video communication, and storing configuration setting information modified via the user interface during the video communication responsive to termination of the video communication with the correspondent terminal.

In accordance with an embodiment, a terminal having a video communication function includes a memory configured to store at least one configuration setting information for a user interface to be displayed during a video communication, a camera configured to capture an image, a wireless communication unit configured to communicate with a correspondent terminal, a display configured to display the at least one configuration setting information which are individually selectable by a user, and a controller configured to apply configuration setting information that corresponds to a selected one of the at least one configuration setting information to the user interface for displaying during the video communication.

In accordance with an embodiment, a method of controlling a terminal having a video communication function includes storing at least one configuration setting information for a user interface to be displayed during a video communication, performing the video communication with a correspondent terminal, displaying the user interface and the at least one configuration setting information, and applying configuration setting information selected from the displayed at least one configuration setting information to the user interface displayed during the video communication.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawings.

FIG. 3A and FIG. 3B are front views of a terminal according to one embodiment of the present invention.

FIG. 15 is a flowchart illustrating controlling a video communication in a terminal according to an embodiment of the present invention.

DETAILED DESCRIPTION OF PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the terms 'module', 'unit' and 'part' can be used together or interchangeably.

Embodiments of the present invention can be applicable to various types of terminals. Examples of such terminals include mobile as well as stationary terminals, such as mobile phones, user equipment, smart phones, DTV, computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals.

Figure 1:
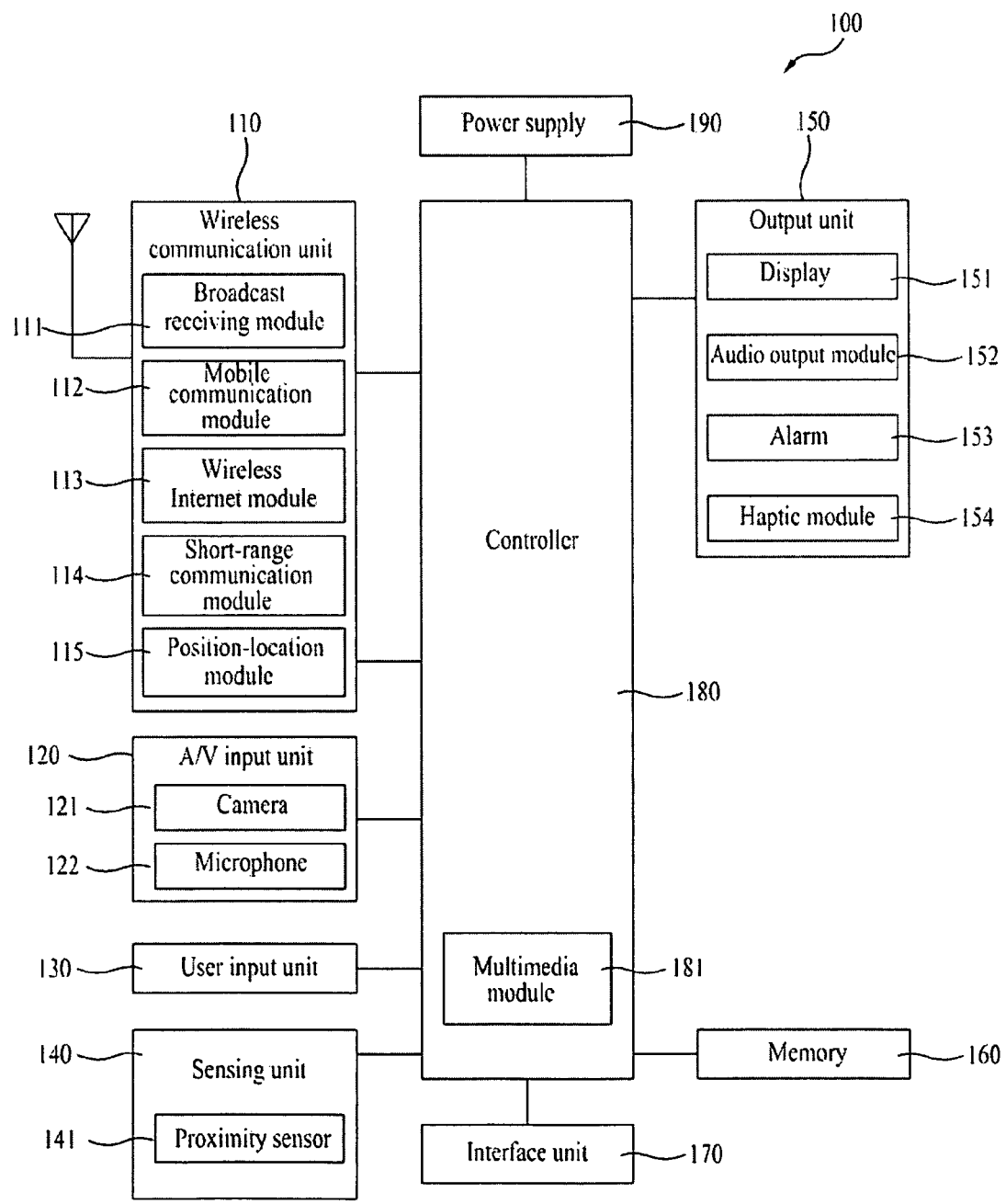
FIG. 1 is a block diagram of a terminal according to one embodiment of the present invention.

FIG. 1 is a block diagram of a mobile terminal 100 in accordance with an embodiment of the present invention. FIG. 1 shows the mobile terminal 100 having various components, but it is understood that implementing all of the illustrated components is not a requirement. Greater or fewer components may alternatively be implemented in the mobile terminal 100.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located. In case of non-mobile terminals, the wireless communication unit 110 can be replaced with a wire communication unit. The wireless communication unit 110 and wire communication unit can be commonly referred to as a communication unit. A broadcast receiving module 111 receives a broadcast signal and/or broadcast associated information from an external broadcast managing entity via a broadcast channel. The broadcast channel may include a satellite channel and a terrestrial channel. The broadcast managing entity generally refers to a system which transmits a broadcast signal and/or broadcast associated information.

Examples of broadcast associated information include information associated with a broadcast channel, a broadcast program, a broadcast service provider, and the like. For example, the broadcast associated information may include an electronic program guide (EPG) of digital multimedia broadcasting (DMB) and an electronic service guide (ESG) of digital video broadcast-handheld (DVB-H).

The broadcast signal may be implemented, for example, as a TV broadcast signal, a radio broadcast signal, and a data broadcast signal. If desired, the broadcast signal may further include a broadcast signal combined with a TV or radio broadcast signal.

The broadcast receiving module 111 may be configured to receive broadcast signals transmitted from various types of broadcast systems. By way of the nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. If desired, data received by the broadcast receiving module 111 may be stored in a suitable device, such as memory 160.

A mobile communication module 112 communicates wireless signals with one or more network entities such as a base station or Node-B. Such signals may represent, for example, audio, video, multimedia, control signaling, and data.

In this case, the mobile communication module 112 transmits/receives video communication signals with other terminals via a video communication channel according to the video communication protocol by H.223, H.245, H.324M or the like. In doing so, the video communication signal contains video, video communication voice and video chatting characters.

A wireless internet module 113 supports Internet access for the mobile terminal 100. This module may be internally or externally coupled to the mobile terminal 100. Suitable technologies for wireless internet may include, but are not limited to, WLAN (Wireless LAN) (Wi-Fi), Wibro (Wireless broadband), Wimax (World Interoperability for Microwave Access), and HSDPA (High Speed Downlink Packet Access). The wireless internet module can be replaced with a wire internet module in non-mobile terminals. The wireless internet module 113 and wire internet module may be commonly referred to as an internet module.

A short-range communication module 114 facilitates relatively short-range communications. Suitable technologies for short-range communication my include, but are not limited to, radio frequency identification (RFID), infrared data association (IrDA), ultra-wideband (UWB), as well as the networking technologies commonly referred to as Bluetooth and ZigBee.

A position-location module 115 identifies or otherwise obtains the location of the mobile terminal 100. This module may be implemented using, for example, global positioning system (GPS) components which cooperate with associated satellites, network components, and combinations thereof.

According to the current technology, the GPS module 115 is able to precisely calculate current 3-dimensional position information based on longitude, latitude and altitude by calculating distance information and precise time information from at least three satellites and then applying triangulation to the calculated information. Currently, location and time information are calculated using three satellites, and errors of the calculated location position and time information are then amended using another satellite. Besides, the GPS module 115 is able to calculate speed information by continuously calculating a real-time current location.

An audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video.

A microphone 122 receives an external audio signal while the portable device is in a particular mode, such as phone call mode, recording mode or voice recognition mode. This audio signal is processed and converted into digital data.

The mobile terminal 100, and specifically the A/V input unit 120, typically includes assorted noise removing algorithms to remove noise generated in the course of receiving the external audio signal. Data generated by the A/V input unit 120 may be stored in the memory 160, utilized by the output unit 150, or transmitted via one or more modules of communication unit 110. If desired, two or more microphones and/or cameras may be used.

A user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a display, which will be described in more detail below.

A sensing unit 140 provides status measurements of various aspects of the mobile terminal 100. For example, the sensing unit 140 may detect an open/close status of the mobile terminal 100, relative positioning of components such as a display 151 and keypad of the mobile terminal, a change of position of the mobile terminal or a component of the mobile terminal, presence or absence of user contact with the mobile terminal, orientation or acceleration/deceleration of the mobile terminal. If the mobile terminal 100 is configured as a slide-type mobile terminal, the sensing unit 140 may sense whether a sliding portion of the mobile terminal is open or closed.

Meanwhile, the output unit 150 is provided to generate an output relevant to a sight sense, an auditory sense, a tactile sense or the like. The output unit 150 includes a display unit 151, an audio output module 152, an alarm unit 153, a haptic module 154 and the like.

The display 151 displays or outputs information processed by the mobile terminal 100. For instance, when the mobile terminal 100 is in a call mode, the display 151 displays a user interface (UI) or a graphic user interface (GUI) associated with the call. When the mobile terminal 100 is in a video communication mode or a photograph mode, the display 151 displays a photographed and/or received picture, a UI or a GUI.

The display 151 can include at least one selected from the group consisting of a liquid crystal display (LCD), a thin film transistor liquid crystal display (TFT LCD), an organic light-emitting diode (OLED), a flexible display, and a 3-dimensional display. Some of them can have a transparent or light-transmittive type configuration to enable an external environment to be seen through. This can be called a transparent display. As a representative example for the transparent display, there is a transparent OLED (TOLED) or the like. A backside structure of the display 151 can have the light-transmittive type configuration as well. Owing to this configuration, a user is able to see an object located behind the terminal body through the area occupied by the display 151 of the terminal body.

According to an implementation of the mobile terminal 100, at least two displays 151 can be provided. For instance, a plurality of display units can be provided to a single face of the mobile terminal 100 by being built in one body or spaced apart from the single face. Alternatively, a plurality of the displays 151 can be provided to different faces of the mobile terminal 100.

In case that the display 151 and a sensor for detecting a touch action or touch sensor construct a mutual-layered structure or a touchscreen, the display 151 can be used as an input device as well as an output device. For instance, the touch sensor can include a touch film, a touch sheet, a touchpad or the like.

The touch sensor can be configured to convert a pressure applied to a specific portion of the display 151 or a variation of electrostatic capacity generated from a specific portion of the display 151 to an electric input signal. The touch sensor can be configured to detect a pressure of a touch as well as a position and size of the touch.

If a touch input is provided to the touch sensor, signal(s) corresponding to the touch input is transferred to a touch controller. The touch controller processes the signal(s) and then transfers corresponding data to the controller 180. Therefore, the controller 180 is able to know which portion of the display 151 is touched.

Referring to FIG. 1, the proximity sensor 141 can be provided within the mobile terminal 100 enclosed by the touchscreen or around the touchscreen. The proximity sensor 141 is a sensor that detects presence or absence of an object approaching a prescribed detecting surface or an object existing around the sensor using an electromagnetic field strength or infrared ray without mechanical contact. The proximity sensor 141 generally has durability longer than that of the contact type sensor and also has usages wider than those of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor or the like. In case that the touchscreen is an electrostatic type, the proximity sensor 141 is configured to detect proximity of a pointer using a variation of an electric field according to the proximity of the pointer. In this case, the touchscreen or touch sensor can be classified into the proximity sensor 141.

In the following description, for clarity, an action that a pointer approaches without contacting with the touchscreen to be recognized as located on the touchscreen is named 'proximity touch'. An action that a pointer actually touches the touchscreen is named 'contact touch'. The meaning of the location of the touchscreen proximity-touched by the pointer means the position of the pointer which vertically opposes the touchscreen when the pointer performs the proximity touch.

The proximity sensor 141 detects a proximity touch and a proximity touch pattern, for example, a proximity touch distance, a proximity touch duration, a proximity touch position, and a proximity touch shift state. Information corresponding to the detected proximity touch action and the detected proximity touch pattern can be output to the touchscreen.

The audio output module 152 is able to output audio data that is received from the wireless communication unit 110 in a call signal reception mode, a call mode, a recording mode, a voice recognition mode, a broadcast receiving mode or the like. The audio output module 152 is able to output audio data stored in the memory 160. The audio output module 152 is able to output an audio signal relevant to a function, such as a call signal receiving sound and a message receiving sound, performed by the mobile terminal 100. The audio output module 152 can include a receiver, a speaker, a buzzer or the like.

The alarm unit 153 outputs a signal for announcing an event occurrence of the mobile terminal 100. An event occurring in the mobile terminal 100 can include one of a call signal reception, a message reception, a key signal input, a touch input and the like. The alarm unit 153 is able to output a signal for announcing an event occurrence by ways of vibration or the like as well as a video signal or an audio signal. The video signal can be output via the display 151. The audio signal can be output via the audio output module 152. Hence, the display 151 or the audio output module 152 can be classified into a part of the alarm unit 153.

The haptic module 154 brings about various haptic effects that can be sensed by a user. Vibration is the representative example for the haptic effect brought about by the haptic module 154. Strength and pattern of the vibration generated from the haptic module 154 are controllable. For instance, vibrations differing from each other are output in a manner of being synthesized together or can be sequentially output.

The haptic module 154 is able to generate various haptic effects including a vibration, an effect caused by such a stimulus as a pin array vertically moving against a contact skin surface, a jet power of air via outlet, a suction power of air via inlet, a skim on a skin surface, a contact of electrode, an electrostatic power and the like, and an effect by hot/cold sense reproduction using an endothermic or exothermic device as well as the vibration.

The haptic module 154 is able to carry the haptic effect via direct contact. The haptic module 154 can be implemented to enable a user to experience the haptic effect via muscular sense of finger, arm or the like. Moreover, at least two haptic modules 154 can be provided according to the configuration type of the mobile terminal 100.

The memory 160 can store a program for operations of the controller 180. The memory 160 is able to temporarily store input/output data, for example, phonebook, message, still picture, and moving picture. The memory 160 is able to store data of vibration and sound in various patterns output in case of a touch input to the touch screen.

The memory 160 can include at least one of a flash memory, a hard disk, a multimedia card micro type memory, a random access memory (RAM), a static random access memory (SRAM), a read-only memory (ROM), an electrically erasable programmable read-only memory, a programmable read-only memory, a magnetic memory, a magnetic disk, an optical disk, a card type memory, such as SD memory and XD memory, and the like. The mobile terminal 100 is able to operate in association with a web storage that performs a storage function of the memory 160 in Internet.

The interface unit 170 plays a role as a passage to all external devices connected to the mobile terminal 100. The interface unit 170 receives data from an external device. The interface unit 170 is supplied with a power and then delivers it to each element within the mobile terminal 100. The interface unit 170 enables data to be transferred to an external device from an inside of the mobile terminal 100. The interface unit 170 can include a wire/wireless headset port, an external charger port, a wire/wireless data port, a memory card port, a port for coupling to a device having an identity module, an audio input/output (I/O) port, a video input/output (I/O) port, an earphone port and the like.

The identity module is a chip that stores various kinds of information for authenticating use authority of the mobile terminal 100. The identify module can include a user identity module (UIM), a subscriber identity module (SIM), a universal subscriber identity module (USIM) or the like. A device provided with the above identity module, which is named an identity device hereinafter, can be manufactured in a smart card form. Hence, the identity device can be connected to the mobile terminal 100 via the port.

The interface unit 170 can play a role as a passage for supplying a power to the mobile terminal 100 from a cradle that is connected to the mobile terminal. The interface unit 170 is able to play a role as a passage for delivering various command signals, which are input from the cradle by a user, to the mobile terminal 100. Various command signals input from the cradle or the power can work as a signal for recognizing that the mobile terminal 100 is correctly loaded in the cradle.

The controller 180 controls overall operations of the mobile terminal 100 in general. For instance, the controller 180 performs control and processing relevant to a voice call, a data communication, a video conference and the like. The controller 180 may have a multimedia module 181 for multimedia playback. The multimedia module 181 can be implemented within the controller 180 or can be configured separate from the controller 180. The controller 180 is able to perform pattern recognizing processing for recognizing a handwriting input performed on the touchscreen as a character or recognizing a picture drawing input performed on the touchscreen as an image.

The power supply unit 190 receives an external or internal power and then supplies the power required for operations of the respective elements under the control of the controller 180.

Various embodiments of the present invention explained in the following description can be implemented within a recording medium that can be read by a computer or a computer-like device using software, hardware or combination thereof.

According to a hardware implementation, the following embodiments can be implemented using at least one of ASICs (application specific integrated circuits), DSPs (digital signal processors), DSPDs (digital signal processing devices), PLDs (programmable logic devices), FPGAs (field programmable gate arrays, processors, controllers, microcontrollers, microprocessors and electrical units for performing other functions. In some cases, the embodiments can be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
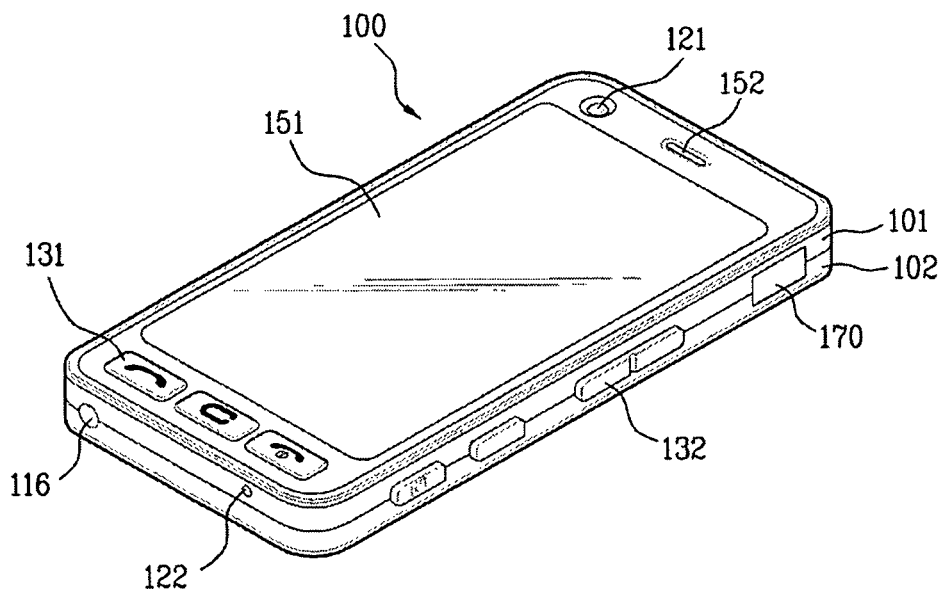
FIG. 2A is a front perspective view of a terminal according to one embodiment of the present invention.

FIG. 2A is a front perspective view of a mobile terminal according to one embodiment of the present invention. Referring to FIG. 2A, the mobile terminal 100 may be a bar type terminal body, but alternative configurations are also possible. Examples of such configurations include folder-type, slide-type, bar-type, rotational-type, swing-type and combinations thereof.

The body includes a case, such as casing, housing, and cover that forms an exterior of the mobile terminal 100. In the present invention, the case can be divided into a front case 101 and a rear case 102. Various electric/electronic parts are loaded in a space provided between the front and rear cases 101 and 102. Optionally, at least one middle case can be further provided between the front and rear cases 101 and 102. The cases are formed by injection molding of synthetic resin or can be formed of metal substance such as stainless steel (STS), titanium (Ti) or the like for example.

A display 151, an audio output module 152, a camera 121, user input units 130/131 and 132, a microphone 122, an interface 180 and the like can be provided to the terminal body, and more particularly, to the front case 101.

The display 151 occupies the majority of a main face of the front case 101. The audio output module 151 and the camera 121 are provided to an area adjacent to one end portion of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling operation of the mobile terminal 100. The input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating units 131 or 132 can be diversely set. For instance, a command such as start, end, scroll and the like is input to the first manipulating unit 131. A command for volume adjustment of sound output from the audio output module 152, a command for switching to a touch recognizing mode of the display 151 or the like can be input to the second manipulating unit 132.

Figure 2B:
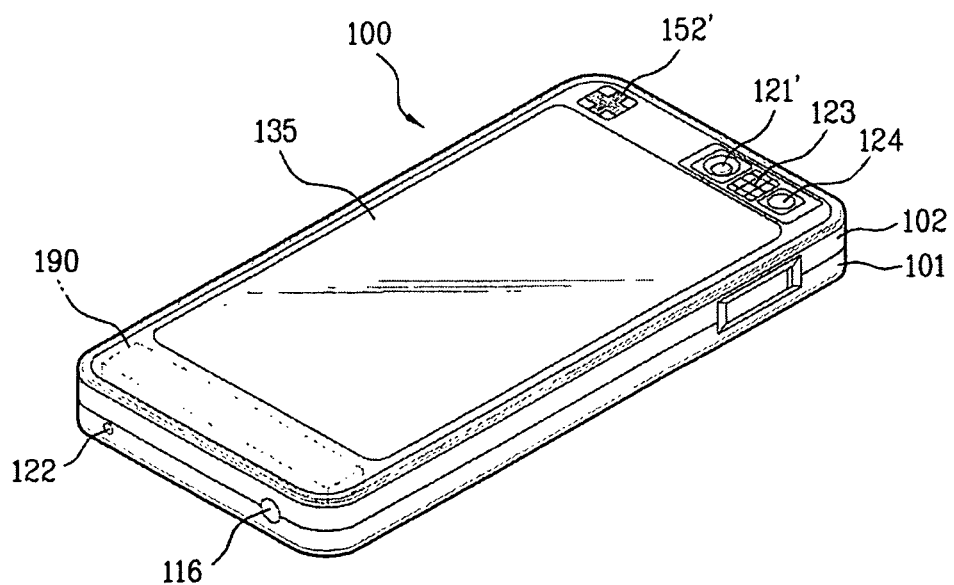
FIG. 2B is a rear perspective view of a terminal according to one embodiment of the present invention.

FIG. 2B is a rear perspective view of the mobile terminal shown in FIG. 2A. Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have a resolution differing from that of camera 121.

Preferably, for instance, the camera 121 has low resolution sufficient to capture and transmit a picture of a user's face for a video call, while the camera 121' has higher resolution for capturing a general subject for photography without transmitting the captured subject. Each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. When a user attempts to take a picture of themselves using the camera 121', the mirror 124 enables the user to view their face as reflected by the mirror 124.

An additional audio output module 152' can be provided to the backside of the terminal body. The additional audio output module 152' is able to implement a stereo function together with the former audio output module 152 shown in FIG. 2A and may be used for implementing a speakerphone mode in the mobile terminal 100.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying power to the mobile terminal 100 is configured with the terminal body. The power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from both faces, it is able to recognize the visual information via the touchpad 135 as well. The information output from both of the faces can be entirely controlled by the touchpad 135. Alternatively, a display 151 may be further provided to the touchpad 135 so that a touchscreen can be provided to the rear case 102 as well.

The touchpad 135 is activated by interconnecting with the display 151 of the front case 101. The touchpad 135 can be provided behind the display 151 in parallel. The touchpad 135 can have a size equal to or smaller than that of the display 151.

Interconnected operational mechanism between the display 151 and the touchpad 135 are explained with reference to FIG. 3A and FIG. 3B.

Figure 3A:
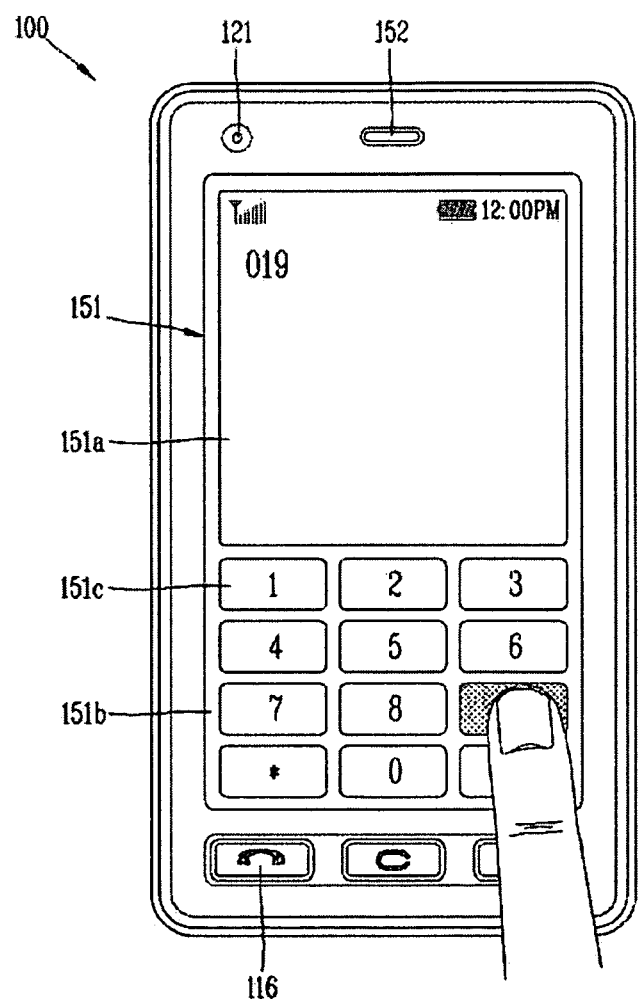

Referring to FIG. 3A and FIG. 3B, various kinds of visual information can be displayed on the display 151. This information includes characters, numerals, symbols, graphics, icons and the like.

In order to input the information, at least one of the characters, numerals, symbols, graphics and icons are represented as a single predetermined array to be implemented in a keypad formation. This keypad formation can be so-called 'soft keys'.

FIG. 3A shows that a touch applied to a soft key is input through a front face of a terminal body. The display 151 is operable through an entire area or by being divided into a plurality of regions. In the latter case, a plurality of the regions can be configured interoperable.

For instance, an output window 151a and an input window 151b are displayed on a top portion and a bottom portion of the display 151, respectively. A soft key 151c representing a digit for inputting a phone number or the like is output to the input window 151b. If the soft key 151c is touched, a digit corresponding to the touched soft key is output to the output window 151a. If the first manipulating unit 131 is manipulated, a call connection for the phone number displayed on the output window 151a is attempted.

FIG. 3B shows that a touch applied to a soft key is input through a rear face of a terminal body. Compared to FIG. 3A that shows a case that the terminal body is vertically arranged in portrait orientation, FIG. 3B shows a case that the terminal body is horizontally arranged in landscape orientation. The display 151 can be configured to change an output picture according to the arranged direction of the terminal body.

In FIG. 3B, a text input mode is activated in the mobile terminal 100. An output window 135a and an input window 135b are displayed on the display 151. A plurality of soft keys 135c representing at least one of characters, symbols and digits can be arranged in the input window 135b. The soft keys 135c can be arranged in the QWERTY key formation.

If the soft keys 135c are touched through the touchpad 135, the characters, symbols and digits corresponding to the touched soft keys are output to the output window 135a. Thus, the touch input via the touchpad 135 is advantageous in that the soft key 135c can be prevented from being blocked by a finger in case of touch, which is compared to the touch input via the display 151. In case that the display 151 and the touchpad 135 are configured transparent, it is able to visually check fingers located at the backside of the terminal body. Hence, more correct touch inputs are possible.

The display 151 or the touchpad 135 can also be configured to receive a touch input by scrolling. A user scrolls the display 151 or the touchpad 135 to shift a cursor or pointer located at an entity, such as icon or the like, displayed on the display 151. Furthermore, in the case that a finger is shifted on the display 151 or the touchpad 135, a path of the shifted finger can be visually displayed on the display 151. This may be useful in editing an image displayed on the display 151.

To cope with a case that both of the display unit 151 or touchscreen and the touchpad 135 are touched together within a predetermined time period, one function of the mobile terminal 100 can be executed. The above case of the simultaneous touch may correspond to a case that the terminal body is held by a user using a thumb and a first finger, the user clamping the terminal body. The above function can include activation or deactivation for the display 151 or the touchpad 135.

Figure 4:
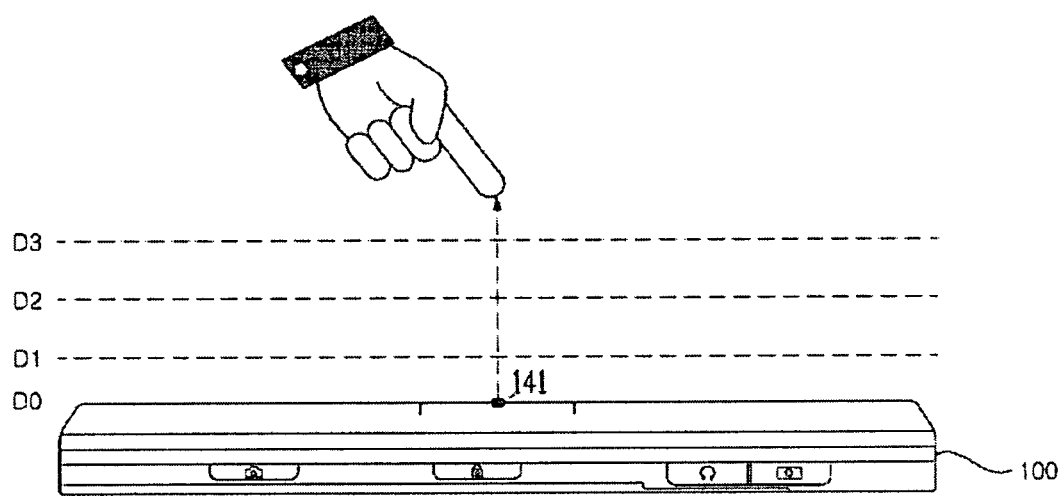
FIG. 4 illustrates the function of proximity depth of a proximity sensor.

The proximity sensor 141 described with reference to FIG. 1 is explained in detail with reference to FIG. 4 as follows. Referring to FIG. 4, when a pointer such as a user's finger, a pen and the like approaches the touchscreen, a proximity sensor 141 provided within or in the vicinity of the touchscreen detects the approach of the pointer and then outputs a proximity signal. The proximity sensor 141 can be configured to output a different proximity signal according to a distance between the pointer and the proximity-touched touchscreen or proximity depth.

In FIG. 4, exemplarily shown is a cross-section of the touchscreen provided with a proximity sensor 141 capable of detecting three proximity depths. It is understood that a proximity sensor 141 capable of detecting proximity depths amounting to the number smaller or greater than 3 is possible.

In detail, in the case that the pointer is fully contacted with the touchscreen (D0), it is recognized as a contact touch. In the case that the pointer is located to be spaced apart from the touchscreen in a distance smaller than D1, it is recognized as a proximity touch to a first proximity depth. In the case that the pointer is located to be spaced apart from the touchscreen in a distance between D1 and D2, it is recognized as a proximity touch to a second proximity depth. In the case that the pointer is located to be spaced apart from the touchscreen in a distance smaller than D3 or equal to or greater than D2, it is recognized as a proximity touch to a third proximity depth. In the case that the pointer is located to be spaced apart from the touchscreen in a distance equal to or greater than D3, the proximity touch is released.

Hence, the controller 180 is able to recognize the proximity touch as one of various input signals according to the proximity depth and position of the pointer. The controller 180 is able to perform various operation controls according to the various input signals.

Figure 5:
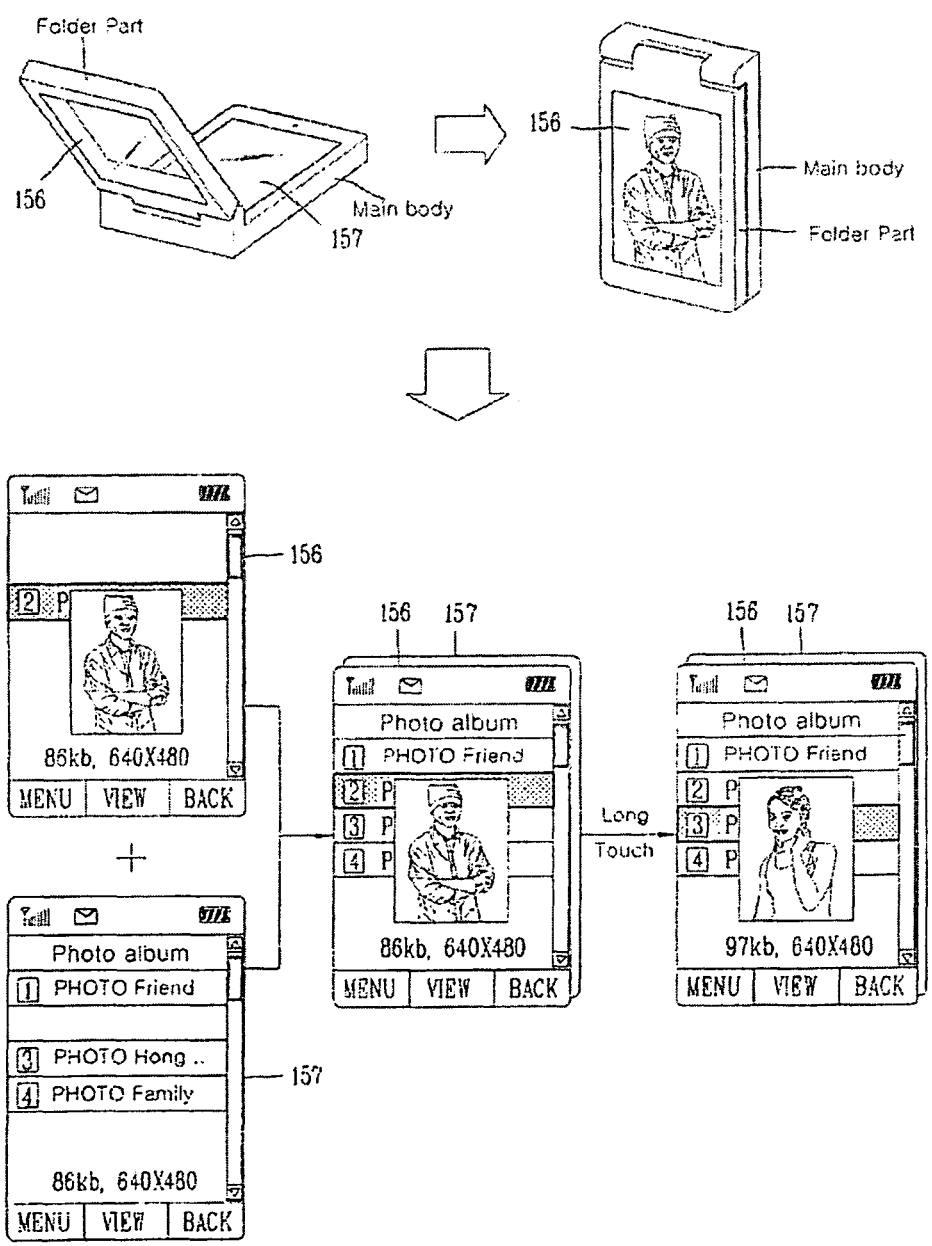
FIG. 5 illustrates controlling a touch action on a pair of display units overlapped with each other in a terminal according to one embodiment of the present invention.

FIG. 5 shows a method of controlling a touch action when a pair of display units 156 and 157 are overlapped with each other. Referring to FIG. 5, the exemplified mobile terminal 100 is a folder type terminal in which a folder part is connected to a main body such that the folder part can be folded or unfolded relative to the main body.

A first display 156 provided to the folder part is a light-transmittive or transparent type such as TOLED, while a second display 157 provided to the main body may be a non-transmittive type such as LCD. Each of the first and second displays 156 and 157 can include a touch-inputable touchscreen. For instance, if a touch, such as contact touch or proximity touch, to the first display 156 or TOLED is detected, the controller 180 selects or runs at least one image from an image list displayed on the first display 156 according to a touch type and a touch duration.

In the following description, a method of controlling information displayed on a different display unit 157 or an LCD in case of a touch to the first display 156 externally exposed in an overlapped configuration is explained, in which the description is made with reference to input types classified as a touch, a long touch, a long-touch and drag and the like.

In the overlapped state when the mobile terminal 100 is closed, the first display 156 is configured to be overlap with the second display 157. In this state, if a touch different from a touch for controlling an image displayed on the first display 156, for example, a long touch, such as a touch having a duration of at least 2 seconds, is detected, the controller 180 enables at least one image to be selected from an image list displayed on the second display 157 according to the touch input. The selected image is displayed on the first display 156.

The long touch is usable in selectively shifting a specific entity displayed on the second display 157 to the first display 156 without an action for running the corresponding entity. In particular, if a user performs a long touch on a prescribed region of the first display 156 corresponding to a specific entity of the second display 157, the controller 180 controls the corresponding entity to be displayed by being shifted to the first display 156.

Meanwhile, an entity displayed on the first display 156 can be displayed by being shifted to the second display 157 according to such a prescribed touch input to the first display 156 as flicking, swirling and the like. In the drawing, exemplarily shown is that a second menu displayed on the second display 157 is displayed by being shifted to the first display 156.

In the case that another input, for example, dragging is additionally detected together with a long touch, the controller 180 executes a function associated with an image selected by the long touch such that a preview picture for the image can be displayed on the first display 156. In FIG. 5, exemplarily shown is that a preview (picture of a male on the left) for a second menu (image file) is performed.

While the preview image is output, if dragging toward a different image is additionally performed on the first display 156 by maintaining the long touch, the controller 180 shifts a selection cursor or a selection bar of the second display 157 and then displays the image selected by the selection cursor on the preview picture (picture of female on the right). After completion of the touch, including long touch and dragging, the controller 180 displays the initial image selected by the long touch.

The touch action including the long touch and dragging may also be applied to a case when a slide or action of a proximity touch corresponding to the dragging is detected together with a long proximity touch, for example, a proximity touch maintained for about 2 or 3 seconds, to the first display 156. If a touch action differing from the above-mentioned touch actions is detected, the controller 180 is able to operate in the same manner as the general touch controlling method.

This method of controlling the touch action in the overlapped state is applicable to a mobile terminal having a single display. The method of controlling the touch action in the overlapped state is applicable to mobile terminals differing from the folder type terminal having a dual display as well.

Figure 6A:
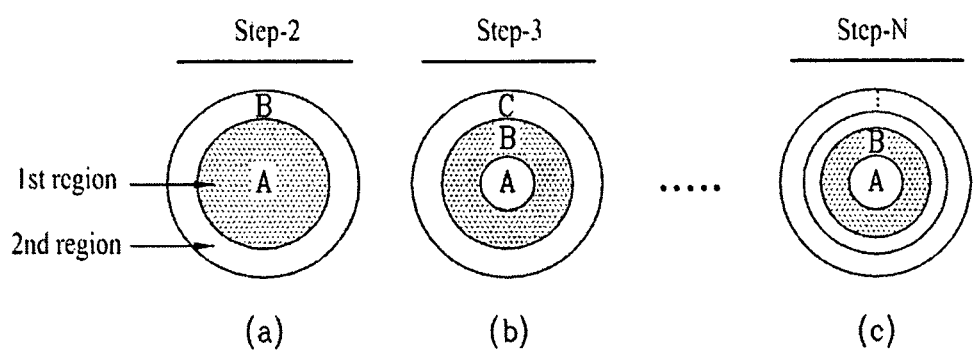
FIG. 6A and FIG. 6B illustrate the function of a proximity touch recognizing area for detecting a proximity signal and a haptic area for generating a tactile effect, respectively.
Figure 6B:
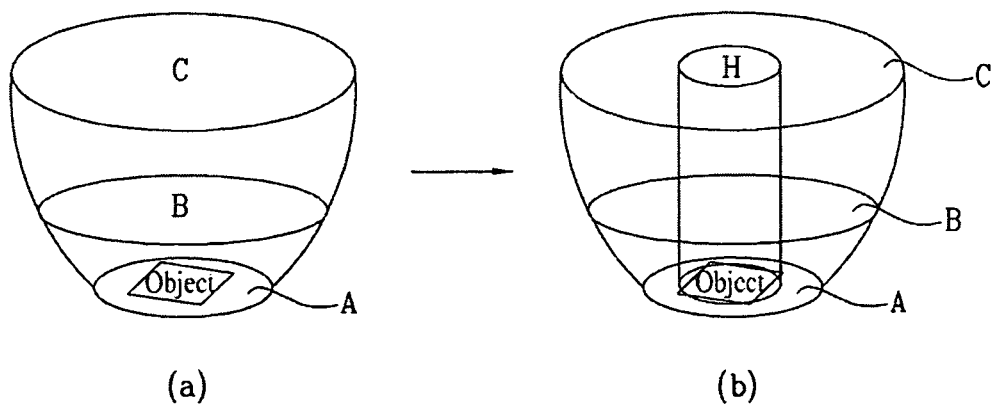

FIG. 6A and FIG. 6B show a proximity touch recognition area and a tactile effect generation region. FIG. 6A represents an object such as an icon, a menu item and the like in generally circular manner for clarity and convenience of explanation.

A region for displaying an object on the display 151, as shown in (a) of FIG. 6A, can be divided into a first region A at a central part and a second region B enclosing the first region A. The first and second regions A and B can be configured to generate tactile effects differing from each other in strength or pattern. For instance, the first and second regions can be configured to generate 2-step vibrations in a manner of outputting a first vibration if the second region B is touched or outputting a second vibration greater than the first vibration if the first region A is touched.

When both the proximity touch recognition region and the haptic region are simultaneously set in the region having the object displayed therein, the haptic region is set for generating the tactile effect to be different from the proximity touch recognition region for detecting the proximity signal. In particular, the haptic region can be set to be narrower or wider than the proximity touch recognition region. For instance, in (a) of FIG. 6A, the proximity touch recognition region can be set to the area including both the first and second regions A and B. The haptic region may also be set to the first region A.

One feature is to distinguish the region having the object displayed therein into three regions A, B and C as shown in (b) of FIG. 6A. Alternatively, another feature is to distinguish the region having the object displayed therein into N regions (N>4) as shown in (c) of FIG. 6A. Each of the divided regions may be configured to generate a tactile effect having a different strength or pattern. When a region having a single object represented therein is divided into at least three regions, the haptic region and the proximity touch recognition region may be set to differ from each other according to a use environment.

One feature is to configure a size of the proximity touch recognition region of the display 151 to vary according to a proximity depth. In particular, referring to (a) of FIG. 6B, the proximity touch recognition region is configured to decrease by C→B→A according to the proximity depth for the display 151. On the contrary, the proximity touch recognition region is configured to increase by C→B→A according to the proximity depth for the display 151. Despite the above configuration, the haptic region may have a predetermined size, as the region 'H' shown in (b) of FIG. 6B, regardless of the proximity depth for the display 151.

In the case of dividing the object-displayed region for the setting of the haptic region or the proximity touch recognition region, it is able to use one of various schemes of horizontal/vertical division, radial division and combinations thereof as well as the concentric circle type division shown in FIG. 6A.

In the following description, various embodiments of a chatting control process in the above configured mobile terminal 100 are explained with reference to the accompanying drawings. It is understood that the following embodiments can be used independently or in combination.

Figure 7:
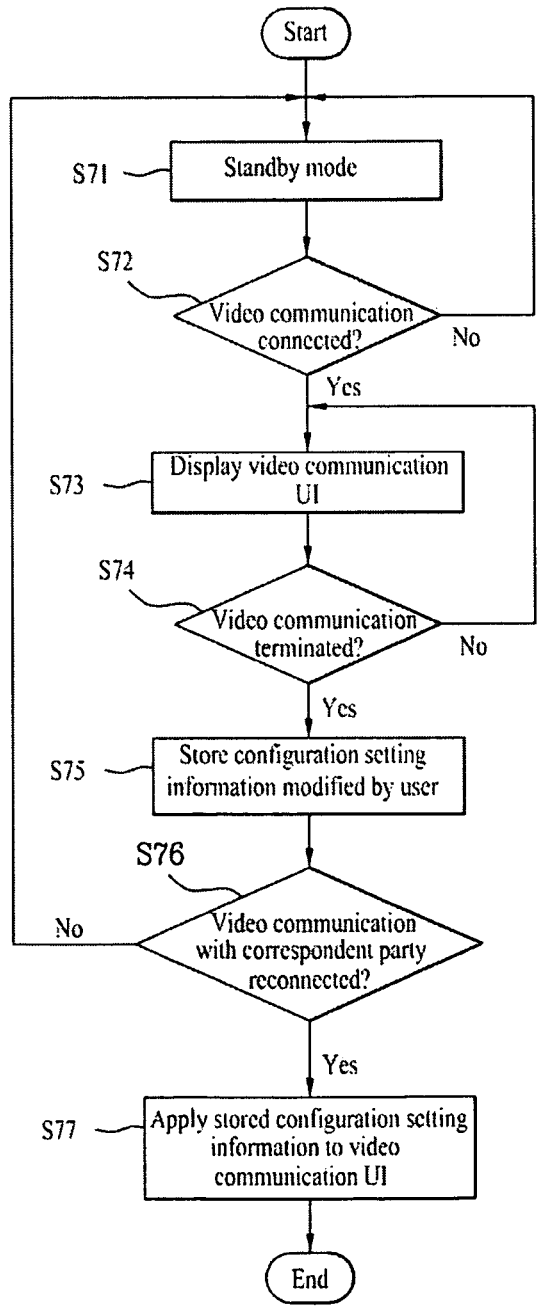
FIG. 7 is a flowchart illustrating controlling a video communication in a terminal according to an embodiment of the present invention.

When the display 151 includes a touchscreen, the following embodiments can be implemented more easily. FIG. 7 is a flowchart illustrating a method of controlling a video communication in a mobile terminal according to an embodiment of the present invention.

Referring to FIG. 7, in a standby mode (S71), if a video communication with a first correspondent party is connected via the wireless communication unit 110 (S72), the controller 180 of the mobile terminal 100 displays a video communication UI for performing the video communication with the first correspondent party on the touchscreen 151 (S73).

The video communication UI may include at least one of a first correspondent party video display window, a user video display window, a replacement video display window or a configuration setting menu window. The configuration setting menu window may include at least one of a camera setting menu, a volume setting menu, a replacement video setting menu, a speaker/receiver setting menu, a mute sound setting menu, a chatting setting menu, a picture capture menu, a recording menu, a phonebook menu, a schedule menu, a memo menu, or the like.

In particular, a user is able to modify configuration setup of the video communication UI using the configuration setting menu window while performing the video communication with the first correspondent party. If the video communication is terminated (S74), the controller 180 extracts the configuration setting information modified by the user through the input unit 130 or the touchscreen 151 and stores the extracted configuration setting information in the memory 160 as a table format (S75).

If contact address information is included in a phonebook provided to the memory 160, the controller 180 stores the extracted configuration information setting information in the contact address information of the first correspondent party and displays a first identifier indicating that the configuration setting information is stored in the contact address information of the first correspondent party. In this case, the contact address information may include at least one of a name, a mobile phone number, a home phone number, a fax number, an e-mail address, or a homepage address of the first correspondent party.

If a user selects the first identifier by manipulating the user input unit 130 or the touchscreen 151, the controller 180 connects the video communication with the first correspondent party via the wireless communication unit 110 and applies the stored configuration setting information to the video communication UI with the first correspondent party. When the video communication with the first correspondent party is terminated, if the video communication with the first correspondent party is reconnected via the wireless communication unit 110 (S76), the controller 180 applies the configuration setting information stored in the memory 160 to the video communication UI with the first correspondent party (S77).

If a plurality of the configuration setting information are stored in the memory 160, the controller 180 displays a plurality of the configuration setting information as icons. When a user selects one of the plurality of configuration setting information, the controller 180 is able to apply the selected configuration setting information to the video communication UI.

In one aspect, if a plurality of the configuration setting information are stored in the memory 160, the controller 180 obtains use frequencies of a plurality of the configuration setting information and applies the configuration setting information having the highest use frequency to the video communication UI.

The controller 180 obtains use frequencies of objects within the stored configuration setting information, iconizes the objects in order of the obtained use frequencies, and then applies the iconized objects to the video communication UI picture according to the order. The objects may include at least one of a camera setting menu, a volume setting menu, a replacement video setting menu, a speaker/receiver setting menu, a mute sound setting menu, a chatting setting menu, a picture capture menu, a recording menu, or a memo menu.

The controller 180 may display a first icon for reconstructing the video communication UI, to which the configuration setting menu is applied, into the previous configuration setting state. In particular, if a user selects the first icon, the controller 180 reconstructs the configuration setting information applied video communication UI into an initial default video communication UI.

In order to enable a user to recognize that the configuration setting information was applied to a current video communication UI, the controller 180 may display a second identifier indicating that the configuration setting information was applied to the video communication UI. If the user selects the second identifier by manipulating the user input unit 130 or the touchscreen 151, the controller 180 is able to display details of the configuration setting information applied to the video communication UI.

Moreover, if the configuration setting information is applied to the video communication UI, the controller 180 is able to transmit the applied configuration setting information to the first correspondent party via the wireless communication unit 110. In particular, the first correspondent party applies the configuration setting information, which is received from the mobile terminal 100, to the video communication UI and configures the video communication UI to have the same conditions as the mobile terminal 100 according to the above described embodiment of the present invention.

A process for controlling a video communication of a mobile terminal 100 according to various embodiments of the present invention are explained with reference to FIGS. 8 to 13. Referring to (a) of FIG. 8, a video communication UI 80 in an initial default mode is displayed on the display 151. For example, the video communication UI 80 in the initial default mode includes a user video display window 81*a*, a first correspondent party video display window 81*b* and a configuration setting menu window 81*c*.

Figures 8, 9:
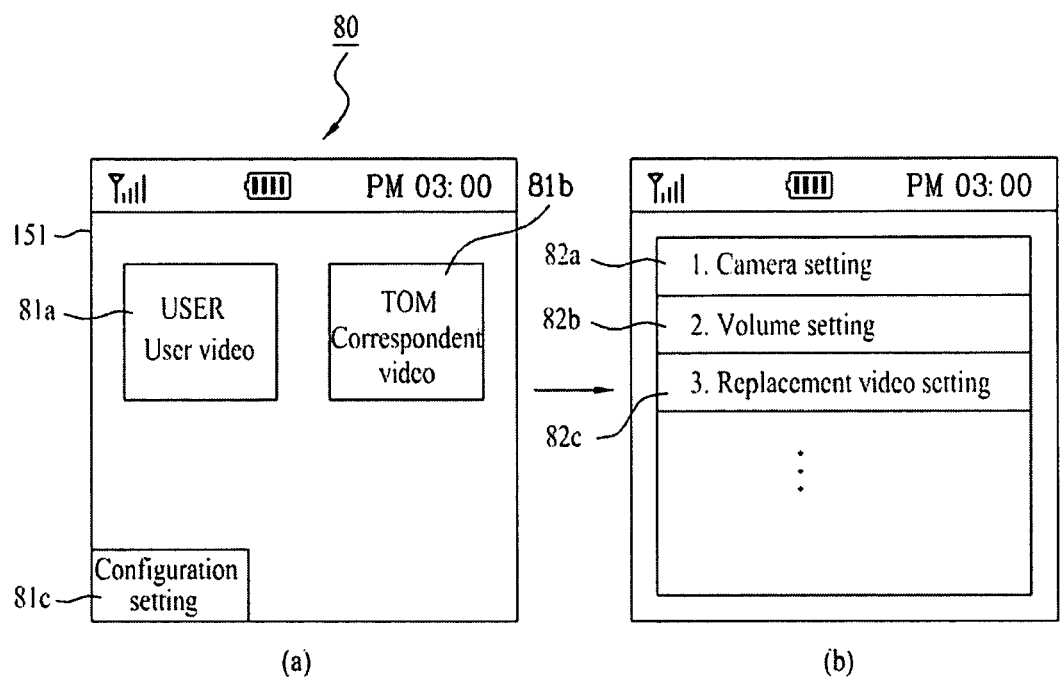
FIG. 8 is a screen view displaying an initial video communication UI picture in a terminal according to an embodiment of the present invention.
FIG. 9 is a table indicating configuration setting information modified by a user for the video communication UI picture shown in FIG. 8 according to an embodiment of the present invention.

Referring to (b) of FIG. 8, once activated, the configuration setting menu window 81*c* includes a camera setting menu 82*a*, a volume setting menu 82*b*, a replacement video setting menu 82*c*, a speaker/receiver setting menu, a mute sound setting menu, a chatting setting menu, a picture capture menu, a recording menu, a memo menu and the like. In particular, a user is able to modify the configuration setting on the video communication UI 80, as shown in the table shown in FIG. 9, by manipulating the menu items 82*a*, 82*b*, 82*c* of the configuration setting menu window 81*c* shown in (b) of FIG. 8.

Figure 10:
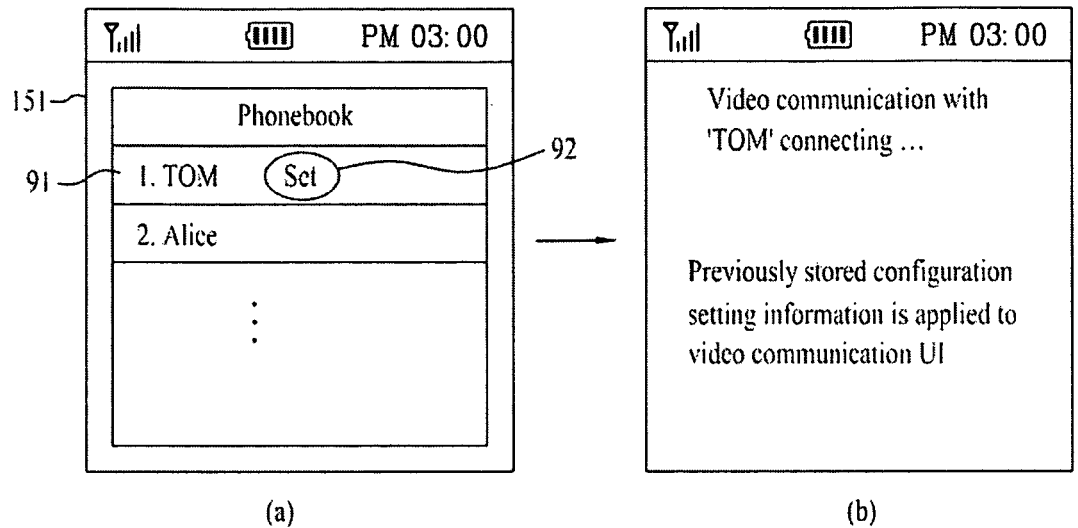
FIG. 10 is a screen view displaying a screen status according to an embodiment of the present invention, the screen status indicating that the configuration setting information shown in FIG. 9 is stored in a first correspondent party's contact address information within a phonebook.

Referring to (a) of FIG. 10, the controller 180 stores the configuration setting information shown in FIG. 9 by mapping the configuration setting information within contact address information 91 of the first correspondent party "TOM." The controller 180 displays a first identifier 92 "Set" indicating that the configuration setting information is stored within the contact address information 91 on the display 151.

If a user selects the first identifier 92 by manipulating the user input unit 130 or the touchscreen 151, the controller 180 connects a video communication with the first correspondent party via the wireless communication unit 110 and applies the configuration setting information shown in FIG. 9 to the video communication UI with the first correspondent party, as shown in (b) of FIG. 10.

Figure 11:
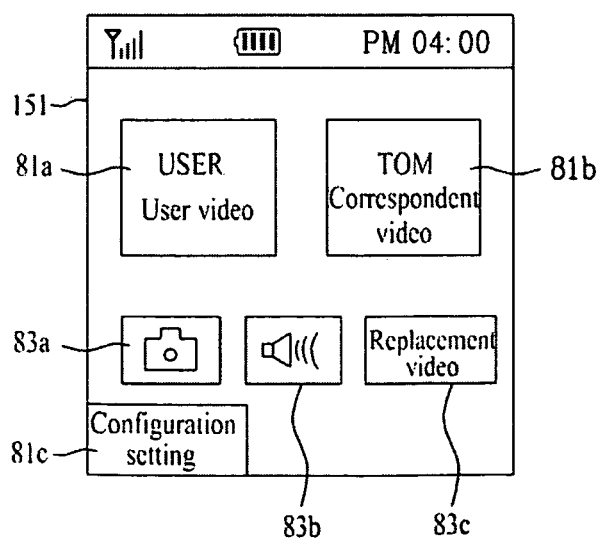
FIG. 11 is a screen view displaying a screen status according to an embodiment of the present invention, the screen status indicating that the configuration setting information shown in FIG. 9 is applied to a video communication UI picture.

Subsequently, if the video communication with the first correspondent party "TOM" is reconnected, the controller 180 applies the configuration setting information shown in FIG. 9 to the video communication UI, as shown in FIG. 11. In particular, the controller 180 obtains use frequencies of objects within the stored configuration setting information, iconizes the objects in the order of the obtained use frequencies, and applies them to the video communication UI according to the order, as shown in FIG. 11. Icons 83*a*, 83*b*, and 83*c* shown in FIG. 11 correspond to camera setting 82*a*, volume setting 82*b*, and replacement video setting 82*c*, respectively, shown in FIGS. 8 and 9.

Figure 12:
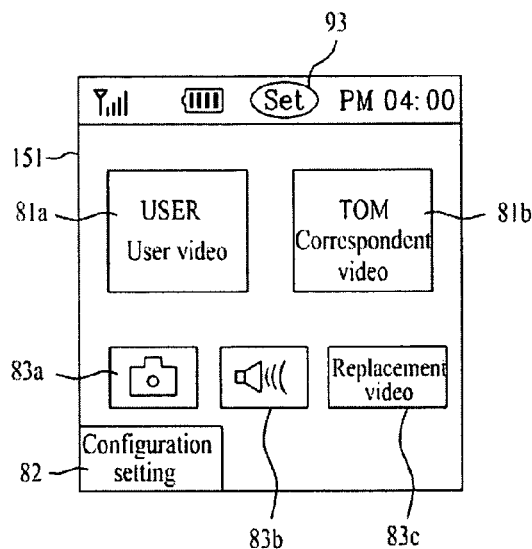
FIG. 12 is a screen view displaying a screen status according to an embodiment of the present invention, the screen status including an identifier informing a user that the configuration setting information shown in FIG. 9 is applied to a video communication UI picture.

Referring to FIG. 12, to notify a user that the configuration setting information shown in FIG. 9 is applied to the current video communication UI, the controller 180 displays a second identifier 93 "Set" indicating that the configuration setting information is applied to the video communication UI. If the user selects the second identifier 93 by manipulating the user input unit 130 or the touchscreen 151, the controller 180 displays details of the configuration setting information applied to the video communication UI.

Figure 13:
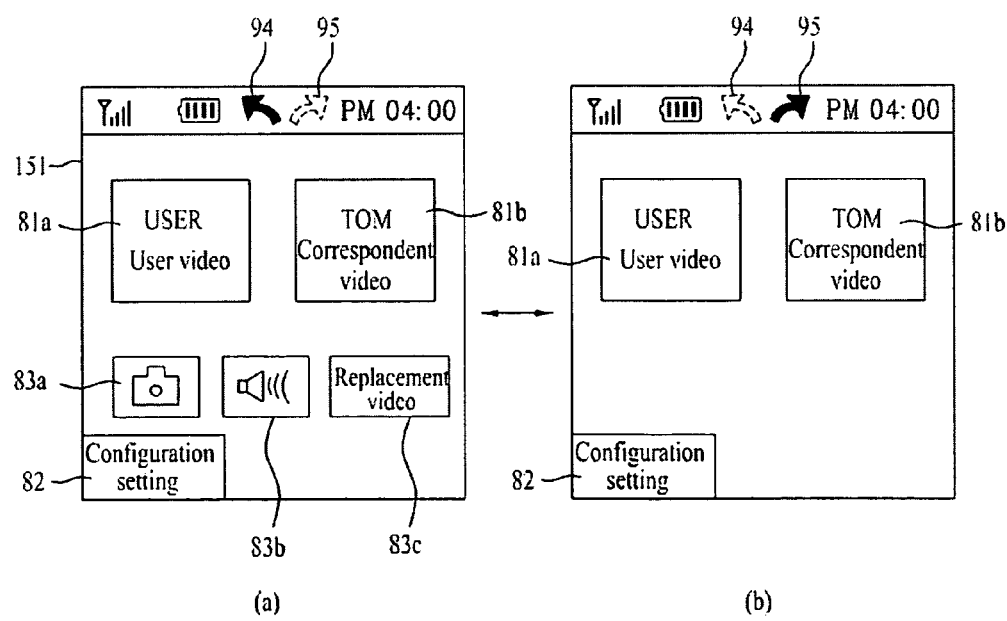
FIG. 13 is a screen view displaying a screen status according to an embodiment of the present invention, the screen status including a switching process between an initial video communication UI picture and a configuration setting information applied video communication UI picture.

Referring to FIG. 13, the controller 180 displays first and second icons 94 and 95 for the switching between the video communication UI, to which the configuration setting information shown in FIG. 9 is applied, and a video communication UI of an initial default shown in FIG. 8. In particular, referring to (a) of FIG. 13, if a user selects the first icon 94 by manipulating the user input unit 130 or the touchscreen 151, the controller 180 switches the video communication UI having the configuration setting information shown in FIG. 9 applied thereto to the latter video communication UI picture of the initial default in FIG. 8. Referring to (b) of FIG. 13, if a user selects the second icon 95 by manipulating the user input unit 130 or the touchscreen 151, the controller 180 switches the video communication UI of the initial default shown in FIG. 8 to the video communication UI having the configuration setting information of FIG. 9 applied thereto.

Figure 14:
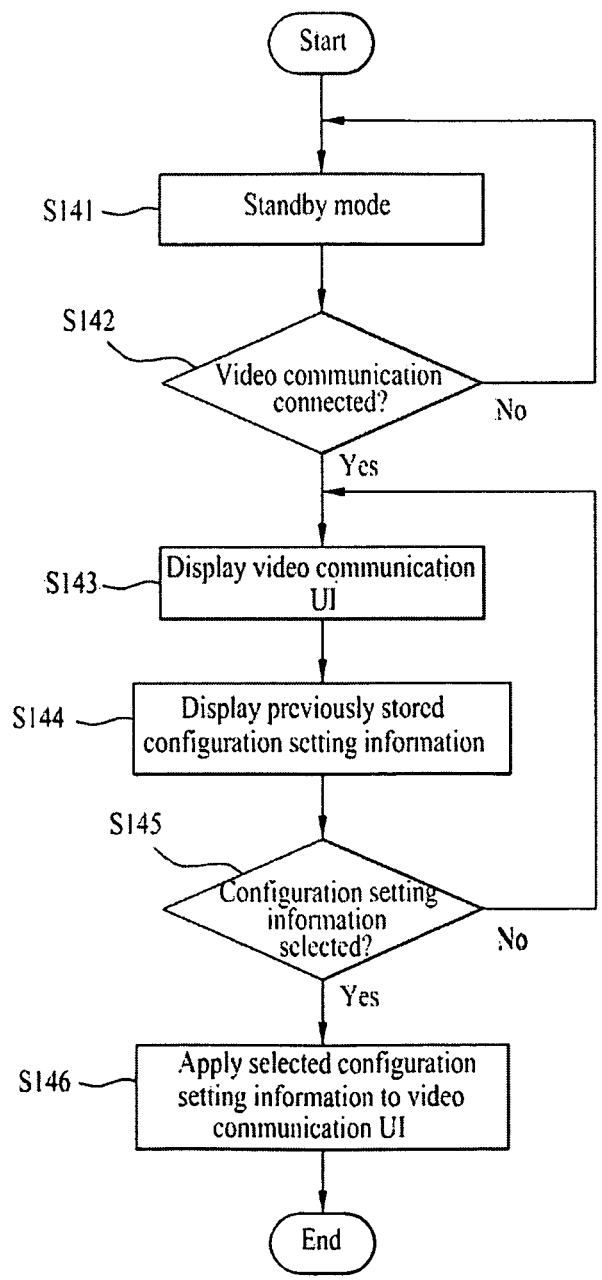
FIG. 14 is a flowchart illustrating controlling a video communication in a terminal according to an embodiment of the present invention.

FIG. 14 is a flowchart illustrating a method of controlling a video communication in a mobile terminal according to an embodiment of the present invention. Referring to FIG. 14, in a standby mode (S141), if a video communication with a first correspondent party is connected via the wireless communication unit 110 (S142), the controller 180 displays a video communication UI for performing the video communication with the first correspondent party on the touchscreen 151 (S143).

Subsequently, the controller 180 displays a plurality of configuration setting information previously provided to the memory 160 on the video communication UI (144). In this case, the controller 180 displays the configuration setting information in a manner of listing or iconizing the provided configuration setting information. The configuration setting information is previously set to configuration setting menu values for configuring the video communication UI for different uses.

For instance, the configuration setting information can be set for uses such as a general mode, a business mode, a social interaction mode and the like. In particular, the configuration setting information for the general mode use, as shown in FIG. 9, may include the configuration setting information in which the configuration setting content modified by a user during a video communication is stored.

The configuration setting information for the business mode use is used when performing a video communication with a person associated with business. Moreover, the configuration setting information for the social interaction mode use is used when performing a video communication with a person familiar with the user.

As mentioned in the above description, if one of the configuration setting information is selected from the configuration setting information list (S145), the controller 180 applies the selected configuration setting information to the video communication UI (S146). In particular, if the configuration setting information for the general mode use is selected from the configuration setting information list, the controller 180 applies the configuration setting information, as shown in FIG. 14, to the video communication UI.

If the configuration setting information for the business mode use is selected from the configuration setting information list, the controller 180 is able to display business card information of the user on the user video display window 81a or the replacement video display window. Moreover, the controller 180 is able to preferentially display a phonebook menu, a memo menu, a schedule menu and the line on the video communication UI by iconizing the corresponding menus.

If the configuration setting information for the social interaction mode use is selected from the configuration setting information list, the controller 180 displays camera brightness as bright as possible and then preferentially displays a capture menu, a recording menu and the like. As mentioned above, to inform a user that the selected configuration setting information is applied to the current video communication UI, the controller 180 displays a second identifier 93 indicating that the configuration setting information is applied to the video communication UI.

As also mentioned in the foregoing description, the controller 180 is able to display first and second icons 94 and 95 for switching between the configuration setting information applied video communication UI and a video communication UI of an initial default. If the selected configuration setting information is applied to the video communication UI, the controller 180 is able to transmit the selected configuration setting information to the first correspondent party via the wireless communication unit 110. If the configuration setting is modified by a user on the video communication UI to which the selected configuration setting information is applied, the controller 180 extracts content of the modified configuration setting and stores the extracted configuration setting content in the memory 160 by updating it to the selected configuration setting information.

FIG. 15 is a flowchart illustrating a method of controlling a video communication in a mobile terminal according to an embodiment of the present invention. Referring to FIG. 15, a user groups contact address information included in a phonebook into a plurality of groups (S151). If the user selects configuration setting information to map with each of the plurality of groups from configuration setting information previously provided to the memory 160, the controller 180 stores the selected configuration setting information by mapping the selected configuration setting information to each of the groups (S152). For example, the groups can be grouped on the phonebook according to 'normal,' 'business,' 'friend' and the like.

In a standby mode (S153), the controller 180 searches the groups for the group to which contact address information of the first correspondent party belongs (S154). If a video communication with a first correspondent party is connected via the wireless communication unit 110 (S155), the controller 180 extracts the configuration setting information mapped to the searched group (S156) and displays a video communication UI having the extracted configuration setting information applied thereto (S157).

For instance, if the contact address information of the first correspondent party belongs to the 'business' group, the controller 180 applies the configuration setting information for the 'business mode' use, which is mapped to the 'business' group, to the video communication UI. If the contact address information of the first correspondent party belongs to the 'friend' group, the controller 180 applies the configuration setting information for the 'social interaction mode' use, which is mapped to the 'friend' group, to the video communication UI.

As mentioned in the foregoing description, to inform a user that the extracted configuration setting information is applied to the current video communication UI, the controller 180 may display a second identifier 93, as shown in FIG. 12, indicating that the configuration setting information is applied to the video communication UI. Further, the controller 180 may also display first and second icons 94 and 95 for switching between the extracted configuration setting information applied video communication UI and a default video communication UI provided by the mobile terminal 100. Moreover, when the extracted configuration setting information is applied to the video communication UI, the controller 180 may transmit the extracted configuration setting information to the first correspondent party via the wireless communication unit 110.

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations such as transmission via the Internet.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A terminal having a video communication function, the terminal comprising:
    a camera configured to capture image data;
    a wireless communication unit configured to permit video communication during which the image data is communicated to a correspondent terminal;
    a memory configured to store the captured image data and contact information related to the correspondent terminal;
    a display configured to display a user interface during the video communication; and
    a controller configured to:
        control the memory to store the contact information and configuration setting information for the user interface that is associated with the contact information and has been modified during the video communication in response to termination of the video communication;
        control the display to display an identifier with the contact information, the identifier indicating that the configuration setting information associated with the contact information is stored;
        connect with the correspondent terminal via the wireless communication unit to establish video communication in response to selection of the identifier; and
        apply the stored configuration setting information to the user interface for the established video communication.

2. The terminal of claim 1, wherein the user interface comprises at least information related to a user of the correspondent terminal engaged in the video communication, information related to a user of the terminal, a configuration setting menu, a replacement image, or menu for selecting the replacement image.

3. The terminal of claim 1, wherein:
the user interface comprises a configuration setting menu; and
the configuration setting menu comprises at least:
a camera setting menu;
a volume setting menu;
a replacement video setting menu;
a speaker setting menu;
a chatting setting menu;
a picture capture menu;
a recording menu;
a phonebook menu;
a schedule menu; or
a memo menu.

4. The terminal of claim 1, wherein:
the user interface comprises first information related to a user of the correspondent terminal engaged in the video communication and second information related to a user of the terminal;
the first information comprises an image of the user of the correspondent terminal; and
the second information comprises an image of the user of the terminal.

5. The terminal of claim 4, wherein the image of the user of the correspondent terminal and the image of the user of the terminal, which is obtained from the camera, are real time images communicated during the video communication.

6. The terminal of claim 1, wherein the controller is further configured to control the display to display the user interface according to the stored configuration setting information associated with the contact information that correspond to the correspondent terminal when the terminal is reconnected with the correspondent terminal for video communication.

7. The terminal of claim 6, wherein the controller is further configured to:
obtain frequency of use of objects within the stored configuration setting information;
iconize the objects in order of the obtained frequency of use; and
control the display to apply the iconized objects to the displayed user interface according to the order in order to display the iconized objects on the display.

8. The terminal of claim 6, wherein the controller is further configured to control the display to display a first indicator and a second indicator which selectively permit switching between the user interface to which the configuration setting information is applied and a default user interface provided by the terminal.

9. The terminal of claim 8, wherein the controller is further configured to:
switch from the user interface to which the configuration setting information is applied to the default user interface when the first indicator is selected; and
switch from the default user interface to the user interface to which the configuration setting information is applied when the second indicator is selected.

10. The terminal of claim 6, wherein the controller is further configured to control the display to display a second identifier during the video communication, the second identifier for indicating that the configuration setting information corresponding to the correspondent terminal has been applied to the user interface.

11. The terminal of claim 10, wherein the controller is further configured to control the display to display details of the configuration setting information on the user interface when the second identifier is selected.

12. The terminal of claim 1, wherein the controller is further configured to transmit the configuration setting information stored in the memory to the correspondent terminal when the video communication with the correspondent terminal is reconnected via the wireless communication unit.

13. A method of controlling a terminal having a video communication function, the method comprising:
performing video communication with a correspondent terminal;
displaying a user interface during the video communication;
storing configuration setting information for the user interface that is associated with contact information related to the correspondent terminal and has been modified via the user interface during the video communication in response to termination of the video communication;
displaying an identifier with the contact information, the identifier indicating that the configuration setting information associated with the contact information is stored;
connecting with the correspondent terminal to establish video communication in response to selection of the identifier; and
applying the stored configuration setting information to the user interface for the established video communication.

14. The method of claim 13, further comprising:
displaying the user interface according to the stored configuration setting information associated with the contact information that correspond to the correspondent terminal when the terminal is reconnected with the correspondent terminal for video communication.

15. The method of claim 14, further comprising:
obtaining frequency of use of objects within the stored configuration setting information;
iconizing the objects in order of the obtained frequency of use; and
applying the iconized objects to the displayed user interface according to the order in order to display the iconized objects.

16. The method of claim 14, further comprising:
displaying a first indicator and a second indicator which selectively permit switching between the user interface to which the configuration setting information is applied and a default user interface provided by the terminal.

17. The method of claim 16, further comprising:
switching from the user interface to which the configuration setting information is applied to the default user interface when the first indicator is selected; and
switching from the default user interface to the user interface to which the configuration setting information is applied when the second indicator is selected.

18. The method of claim 14, further comprising:
displaying a second identifier during the video communication, the second identifier for indicating that the configuration setting information corresponding to the correspondent terminal has been applied to the user interface.

19. The method of claim 18, further comprising:
displaying details of the configuration setting information on the user interface when the second identifier is selected.

20. The method of claim 13, further comprising:
transmitting the stored configuration setting information to the correspondent terminal when the video communication with the correspondent terminal is reconnected.

* * * * *